(12) United States Patent
Endo et al.

(10) Patent No.: US 12,456,898 B2
(45) Date of Patent: Oct. 28, 2025

(54) FLUID MACHINE

(71) Applicant: KABUSHIKI KAISHA TOYOTA JIDOSHOKKI, Kariya (JP)

(72) Inventors: Yuki Endo, Aichi-ken (JP); Hiroshi Saito, Aich-ken (JP); Yuki Okano, Aichi-ken (JP); Hayato Onda, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 168 days.

(21) Appl. No.: 18/028,919

(22) PCT Filed: Sep. 17, 2021

(86) PCT No.: PCT/JP2021/034321
§ 371 (c)(1),
(2) Date: Mar. 28, 2023

(87) PCT Pub. No.: WO2022/070991
PCT Pub. Date: Apr. 7, 2022

(65) Prior Publication Data
US 2023/0336047 A1    Oct. 19, 2023

(30) Foreign Application Priority Data

Sep. 30, 2020   (JP) ................. 2020-165339

(51) Int. Cl.
*H02K 5/16*    (2006.01)
*F16C 17/04*   (2006.01)
*H02K 9/00*    (2006.01)

(52) U.S. Cl.
CPC ............ *H02K 5/16* (2013.01); *F16C 17/045* (2013.01); *H02K 2205/03* (2013.01)

(58) Field of Classification Search
CPC .. H02K 5/00; H02K 5/16; F04B 35/04; F04B 39/06; F04B 39/12; F04B 39/121;
(Continued)

(56) References Cited

U.S. PATENT DOCUMENTS 7,121,725 B2 * 10/2006 Aiello ................ F16C 33/107
384/107
2021/0190140 A1   6/2021 Omori

FOREIGN PATENT DOCUMENTS

| JP | 2014-070730 A | 4/2014 |
| JP | 2017-089384 A | 5/2017 |
| JP | 2020-037975 A | 3/2020 |

OTHER PUBLICATIONS

Communication dated Sep. 19, 2024 in Korean Application No. 10-2023-7010643.
(Continued)

*Primary Examiner* — Tran N Nguyen
(74) *Attorney, Agent, or Firm* — Sughrue Mion, PLLC (57) ABSTRACT

A fluid machine includes a thrust bearing support supporting a dynamic thrust bearing that includes a first dynamic thrust bearing and a second dynamic thrust bearing and including a first bearing base and a second bearing base fixed to each other via a spacer member. The fluid machine includes a main passage through which fluid flows from a motor chamber toward an operation chamber, and a space between an inner side of the spacer member and an outer side of the first dynamic thrust bearing and the second dynamic thrust bearing in a radial direction of a rotary shaft. The space communicates with a first through hole of the first bearing base communicating with the motor chamber and a second through hole of the second bearing base communicating with the main passage. The thrust bearing support includes a connecting passage interconnecting the space and the main passage.

9 Claims, 5 Drawing Sheets

(58) Field of Classification Search
CPC .......... F04D 13/00; F04D 13/06; F04D 13/06;
F04D 13/0606; F04D 17/00; F04D 17/02;
F04D 17/12; F04D 17/122; F04D 29/05;
F04D 29/051; F04D 29/057; F04D
29/059; F04D 29/0513; F04D 29/0516;
F04D 29/102; F16C 17/02; F16C 17/024;
F16C 17/04; F16C 17/045; F16C
32/0692; F16C 32/0674; F16C 32/0614;
F16C 35/02; F16C 37/002; F16C 39/04
See application file for complete search history.

(56) References Cited

OTHER PUBLICATIONS

Chinese Office Action dated Apr. 21, 2025 in Application No. 202180066045.7.

* cited by examiner

FLUID MACHINE

CROSS REFERENCE TO RELATED APPLICATIONS

This application is a National Stage of International Application No. PCT/JP2021/034321 filed Sep. 17, 2021, claiming priority based on Japanese Patent Application No. 2020-165339 filed Sep. 30, 2020, the contents of all of which are incorporated herein by reference in their entirety.

TECHNICAL FIELD

The present disclosure relates to a fluid machine.

BACKGROUND ART

A fluid machine includes a rotary shaft, and an electric motor that rotates the rotary shaft. The fluid machine includes a housing that includes a motor chamber, an inlet hole, an operation chamber, and a discharge chamber. The motor chamber accommodates the electric motor, into which fluid is drawn through the inlet hole. The fluid machine also includes an operation body that causes fluid to be drawn from the motor chamber into the operation chamber and discharged from the operation chamber into the discharge chamber, by rotation of the rotary shaft. The fluid machine may further include a dynamic thrust bearing that rotatably supports the rotary shaft in a thrust direction, a thrust bearing support that supports the dynamic thrust bearing, and a support plate that protrudes radially outward in an annular shape from an outer peripheral surface of the rotary shaft and rotates integrally with the rotary shaft.

In a fluid machine disclosed in Patent Literature 1, for example, a support plate protrudes radially outward from a portion of an outer peripheral surface of a rotary shaft between an operation body and an electric motor. A thrust bearing support includes a first bearing base that is disposed closer to the electric motor than the support plate is, and a second bearing base that is disposed closer to the operation body than the support plate is. A dynamic thrust bearing includes a first dynamic thrust bearing that is disposed between the first bearing base and the support plate, and a second dynamic thrust bearing that is disposed between the second bearing base and the support plate. The first dynamic thrust bearing and the second dynamic thrust bearing rotatably support the support plate in a thrust direction, by which the rotary shaft is rotatably supported in the thrust direction.

In the above-described configuration in which the dynamic thrust bearing disposed between the operation body and the electric motor rotatably supports the rotary shaft in the thrust direction, a runout of the rotary shaft may suitably be suppressed, as compared to a configuration in which, for example, a dynamic thrust bearing rotatably supports a rotary shaft in a thrust direction at a position on a side opposite to an operation body with respect to an electric motor. Therefore, reliability of the fluid machine is improved.

CITATION LIST

Patent Literature

Patent Literature 1: Japanese Patent Application Publication No. 2017-89384

SUMMARY OF INVENTION

Technical Problem

In the fluid machines as those described above, however, in order to rotatably support the rotary shaft in the thrust direction in a stable manner by the first dynamic thrust bearing and the second dynamic thrust bearing, high precision in clearance needs to be obtained between the first dynamic thrust bearing and the support plate and between the second dynamic thrust bearing and the support plate. In addition, since rotation of the rotary shaft increases temperatures of the first dynamic thrust bearing and the second dynamic thrust bearing, the first dynamic thrust bearing and the second dynamic thrust bearing need to be efficiently cooled.

The present disclosure is to solve the above problems, and is directed to providing a fluid machine capable of efficiently cooling a first dynamic thrust bearing and a second dynamic thrust bearing with maintaining high precision in clearance between the first dynamic thrust bearing and a support plate and between the second dynamic thrust bearing and the support plate.

Solution to Problem

A fluid machine to solve the above problems includes a rotary shaft, an electric motor configured to rotate the rotary shaft, a housing including a motor chamber that accommodates the electric motor, an inlet hole through which fluid is drawn into the motor chamber, an operation chamber, and a discharge chamber, an operation body that causes the fluid to be drawn from the motor chamber into the operation chamber and discharged from the operation chamber into the discharge chamber by rotation of the rotary shaft, a dynamic thrust bearing rotatably supporting the rotary shaft in a thrust direction, a thrust bearing support supporting the dynamic thrust bearing, and a support plate protruding radially outward in an annular shape from a portion of an outer peripheral surface of the rotary shaft between the operation body and the electric motor and configured to rotate integrally with the rotary shaft. The thrust bearing support includes a first bearing base disposed closer to the electric motor than the support plate is and having a first through hole through which the rotary shaft extends, and a second bearing base disposed closer to the operation body than the support plate is and having a second through hole through which the rotary shaft extends. The dynamic thrust bearing includes a first dynamic thrust bearing disposed between the first bearing base and the support plate and rotatably supporting the rotary shaft in the thrust direction, and a second dynamic thrust bearing disposed between the second bearing base and the support plate and rotatably supporting the rotary shaft in the thrust direction. The thrust bearing support includes a spacer member disposed on an outer side of the support plate in a radial direction of the rotary shaft and interposed between the first bearing base and the second bearing base. The first bearing base and the second bearing base are fixed to each other via the spacer member. Inside the housing, a main passage is formed, through which the fluid flows from the motor chamber toward the operation chamber while passing outside the first bearing base, the spacer member, and the second bearing base. Inside the housing, the first through hole communicates with the motor chamber. Inside the housing, the second through hole communicates with the main passage. Inside the housing, a space formed between an inner side of the spacer member in the radial direction of the rotary shaft and an outer side of the first dynamic thrust bearing and the second dynamic thrust bearing in the radial direction of the rotary shaft communicates with the first through hole through a clearance between the first dynamic thrust bearing and the support plate and with the second through hole through a clearance between the second dynamic thrust bearing and the support plate. Inside the housing, the thrust bearing support includes a connecting passage interconnecting the space and the main passage.

According to this configuration, since the first bearing base and the second bearing base are fixed to each other via the spacer member, high precision in clearance may be obtained between the first dynamic thrust bearing and the support plate and between the second dynamic thrust bearing and the support plate.

The fluid that has flowed from the motor chamber into the first through hole swirls about by a centrifugal force of the support plate that rotates integrally with the rotary shaft, and flows through the clearance between the first dynamic thrust bearing and the support plate so that the first dynamic thrust bearing is cooled. The fluid that has flowed through the clearance between the first dynamic thrust bearing and the support plate flows into the space that is formed between the inner side of the spacer member in the radial direction of the rotary shaft and the outer side of the first dynamic thrust bearing and the second dynamic thrust bearing in the radial direction of the rotary shaft. On the other hand, the fluid that has flowed from the main passage into the second through hole swirls about by the centrifugal force of the support plate that rotates integrally with the rotary shaft, and flows through the clearance between the second dynamic thrust bearing and the support plate so that the second dynamic thrust bearing is cooled. The fluid that has flowed through the clearance between the second dynamic thrust bearing and the support plate flows into the space that is formed between the inner side of the spacer member in the radial direction of the rotary shaft and the outer side of the first dynamic thrust bearing and the second dynamic thrust bearing in the radial direction of the rotary shaft.

Now, the fluid between the first dynamic thrust bearing and the support plate and the fluid between the second dynamic thrust bearing and the support plate flow into the space that is formed between the inner side of the spacer member in the radial direction of the rotary shaft and the outer side of the first dynamic thrust bearing and the second dynamic thrust bearing in the radial direction of the rotary shaft. As a result, the fluid in the space increases in pressure. This causes a pressure difference in the fluid between the main passage and the space that is formed between the inner side of the spacer member in the radial direction of the rotary shaft and the outer side of the first dynamic thrust bearing and the second dynamic thrust bearing in the radial direction of the rotary shaft. Then, the fluid in the space, which is formed between the inner side of the spacer member in the radial direction of the rotary shaft and the outer side of the first dynamic thrust bearing and the second dynamic thrust bearing in the radial direction of the rotary shaft, flows through the connecting passage to the main passage. This configuration thus allows the fluid to easily flow out from the motor chamber, through the first through hole, through the clearance between the first dynamic thrust bearing and the support plate, into the space that is formed between the inner side of the spacer member in the radial direction of the rotary shaft and the outer side of the first dynamic thrust bearing and the second dynamic thrust bearing in the radial direction of the rotary shaft, and then through the connecting passage to the main passage. This configuration also allows the fluid to easily flow out from the main passage, through the second through hole, through the clearance between the second dynamic thrust bearing and the support plate, to the space that is formed between the inner side of the spacer member in the radial direction of the rotary shaft and the outer side of the first dynamic thrust bearing and the second dynamic thrust bearing in the radial direction of the rotary shaft, and then through the connecting passage into the main passage. As a result, the fluid flowing through the clearance between the first dynamic thrust bearing and the support plate easily cools the first dynamic thrust bearing, and the fluid flowing through the clearance between the second dynamic thrust bearing and the support plate easily cools the second dynamic thrust bearing, so that the first dynamic thrust bearing and the second dynamic thrust bearing are efficiently cooled. As described above, the first dynamic thrust bearing and the second dynamic thrust bearing are efficiently cooled while the high precision in the clearance between the first dynamic thrust bearing and the support plate and between the second dynamic thrust bearing and the support plate is maintained.

In the above-described fluid machine, the spacer member preferably has an annular shape and includes an accommodating hole in which the support plate is accommodatable. The connecting passage is preferably a radial passage formed in the spacer member so as to interconnect an inner periphery and an outer periphery of the spacer member.

According to this configuration, the high precision in the clearance may be obtained between the first dynamic thrust bearing and the support plate and between the second dynamic thrust bearing and the support plate, as compared to a case where, for example, a plurality of spacer members having a tubular shape is disposed around an axis of a rotary shaft and each spacer member is interposed between a first bearing base and a second bearing base. Since the connecting passage is the radial passage formed in the spacer member so as to interconnect the inner periphery and the outer periphery of the spacer member, the connecting passage extends in the radial direction of the rotary shaft from the space, which is formed between the inner side of the spacer member in the radial direction of the rotary shaft and the outer side of the first dynamic thrust bearing and the second dynamic thrust bearing in the radial direction of the rotary shaft, to be connected with the main passage. In this configuration, the fluid, which has swirled about by the centrifugal force of the support plate that rotates integrally with the rotary shaft, and flowed through the clearance between the first dynamic thrust bearing and the support plate and between the second dynamic thrust bearing and the support plate into the space that is formed between the inner side of the spacer member in the radial direction of the rotary shaft and the outer side of the first dynamic thrust bearing and the second dynamic thrust bearing in the radial direction of the rotary shaft, easily flows toward the connecting passage. Thus, the fluid flowing through the clearance between the first dynamic thrust bearing and the support plate easily cools the first dynamic thrust bearing, and the fluid flowing through the clearance between the second dynamic thrust bearing and the support plate easily cools the second dynamic thrust bearing, even further, so that the first dynamic thrust bearing and the second dynamic thrust bearing are further efficiently cooled.

In the above-described fluid machine, the thrust bearing support preferably includes a plurality of the radial passages.

The plurality of radial passages preferably radially extends so as to be spaced in a circumferential direction of the spacer member.

The configuration in which the plurality of radial passages radially extends so as to be spaced in the circumferential direction of the spacer member is suitable for a configuration in which the thrust bearing support includes the plurality of radial passages formed in the spacer member so as to interconnect the inner periphery and the outer periphery of the spacer member. In this configuration, the fluid in the space, which is formed between the inner side of the spacer member in the radial direction of the rotary shaft and the outer side of the first dynamic thrust bearing and the second dynamic thrust bearing in the radial direction of the rotary shaft, easily flows through the radial passages to the main passage, as compared to a case where the thrust bearing support includes only a single radial passage. As a result, the fluid flowing through the clearance between the first dynamic thrust bearing and the support plate easily cools the first dynamic thrust bearing, and the fluid flowing through the clearance between the second dynamic thrust bearing and the support plate easily cools the second dynamic thrust bearing, even further, so that the first dynamic thrust bearing and the second dynamic thrust bearing are further efficiently cooled.

In the above-described fluid machine, the support plate preferably includes a linking passage that links at least one of the first through hole and the second through hole to the space.

This configuration allows fluid from the first through hole or fluid from the second through hole to flow through the linking passage into the space that is formed between the inner side of the spacer member in the radial direction of the rotary shaft and the outer side of the first dynamic thrust bearing and the second dynamic thrust bearing in the radial direction of the rotary shaft, so that the fluid flowing through the linking passage cools the support plate. As a result, heat is exchanged between the first dynamic thrust bearing and the support plate so that the first dynamic thrust bearing is cooled by the support plate, and heat is exchanged between the second dynamic thrust bearing and the support plate so that the second dynamic thrust bearing is cooled by the support plate.

In the above-described fluid machine, the fluid machine preferably includes a dynamic radial bearing disposed between the electric motor and the support plate and rotatably supporting the rotary shaft in the radial direction. The first through hole preferably communicates with a space between the dynamic radial bearing and the rotary shaft. A passage cross-sectional area of the connecting passage is preferably greater than a cross-sectional area of the space between the dynamic radial bearing and the rotary shaft and is preferably greater than a cross-sectional area of a space between the first dynamic thrust bearing and the support plate and a cross-sectional area of a space between the second dynamic thrust bearing and the support plate.

According to this configuration, the fluid in the space, which is formed between the inner side of the spacer member in the radial direction of the rotary shaft and the outer side of the first dynamic thrust bearing and the second dynamic thrust bearing in the radial direction of the rotary shaft, easily flows into the connecting passage, as compared to a case where the passage cross-sectional area of the connecting passage is not greater than the cross-sectional area of the space between the dynamic radial bearing and the rotary shaft, and is not greater than the cross-sectional area of the space between the first dynamic thrust bearing and the support plate and the cross-sectional area of the space between the second dynamic thrust bearing and the support plate. This allows the fluid in the space, which is formed between the inner side of the spacer member in the radial direction of the rotary shaft and the outer side of the first dynamic thrust bearing and the second dynamic thrust bearing in the radial direction of the rotary shaft, to easily flow through the connecting passage to the main passage. As a result, the fluid flowing through the clearance between the first dynamic thrust bearing and the support plate easily cools the first dynamic thrust bearing, and the fluid flowing through the clearance between the second dynamic thrust bearing and the support plate easily cools the second dynamic thrust bearing, so that the first dynamic thrust bearing and the second dynamic thrust bearing are efficiently cooled.

In the above-described fluid machine, a passage cross-sectional area of the first through hole is preferably greater than the cross-sectional area of the space between the dynamic radial bearing and the rotary shaft.

This configuration allows the fluid that has flowed through the space between the dynamic radial bearing and the rotary shaft to easily flow into the first through hole, as compared to a case where, for example, the passage cross-sectional area of the first through hole is not greater than the cross-sectional area of the space between the dynamic radial bearing and the rotary shaft. Therefore, the fluid flowing through the space between the dynamic radial bearing and the rotary shaft easily flows through the first through hole and between the first dynamic thrust bearing and the support plate, in addition that the fluid in the space, which is formed between the inner side of the spacer member in the radial direction of the rotary shaft and the outer side of the first dynamic thrust bearing and the second dynamic thrust bearing in the radial direction of the rotary shaft, easily flows into the connecting passage, by which the first dynamic thrust bearing is further efficiently cooled.

In the above-described fluid machine, the fluid machine preferably includes a dynamic radial bearing disposed between the electric motor and the support plate and rotatably supporting the rotary shaft in the radial direction. The first through hole preferably communicates with a space between the dynamic radial bearing and the rotary shaft. A passage cross-sectional area of the first through hole is preferably greater than the cross-sectional area of the space between the dynamic radial bearing and the rotary shaft.

According to this configuration, the fluid that has flowed through the space between the dynamic radial bearing and the rotary shaft easily flows into the first through hole, as compared to a case where, for example, the passage cross-sectional area of the first through hole is not greater than the cross-sectional area of the space between the dynamic radial bearing and the rotary shaft. Therefore, the fluid flowing through the space between the dynamic radial bearing and the rotary shaft easily flows through the first through hole and between the first dynamic thrust bearing and the support plate, by which the first dynamic thrust bearing is efficiently cooled.

In the above-described fluid machine, a passage cross-sectional area of a part of the main passage downstream from a joint part of the main passage where the main passage is joined to the connecting passage is preferably greater than a sum of a passage cross-sectional area of a part of the main passage upstream from the joint part of the main passage where the main passage is joined to the connecting passage, the cross-sectional area of the space between the first dynamic thrust bearing and the support plate, and the cross-sectional area of the space between the second dynamic thrust bearing and the support plate.

As compared to a case where, for example, the passage cross-sectional area of the part of the main passage downstream from the joint part of the main passage where the main passage is joined to the connecting passage is not greater than the sum of the passage cross-sectional area of the part of the main passage upstream from the joint part of the main passage where the main passage is joined to the connecting passage, the cross-sectional area of the space between the first dynamic thrust bearing and the support plate, and the cross-sectional area of the space between the second dynamic thrust bearing and the support plate, the fluid in the part of the main passage downstream from the joint part of the main passage where the main passage is joined to the connecting passage smoothly flows in the above-described fluid machine, and thus the fluid in the space, which is formed between the inner side of the spacer member in the radial direction of the rotary shaft and the outer side of the first dynamic thrust bearing and the second dynamic thrust bearing in the radial direction of the rotary shaft, easily flows through the connecting passage to the main passage. As a result, the fluid flowing through the clearance between the first dynamic thrust bearing and the support plate easily cools the first dynamic thrust bearing, and the fluid flowing through the clearance between the second dynamic thrust bearing and the support plate easily cools the second dynamic thrust bearing, so that the first dynamic thrust bearing and the second dynamic thrust bearing are efficiently cooled.

In the above-described fluid machine, the fluid machine may include a dynamic radial bearing disposed between the electric motor and the support plate and rotatably supporting the rotary shaft in the radial direction. The first through hole may communicate with a space between the dynamic radial bearing and the rotary shaft. A passage cross-sectional area of a part of the main passage downstream from a joint part of the main passage where the main passage is joined to the connecting passage may be greater than a sum of a passage cross-sectional area of a part of the main passage upstream from the joint part of the main passage where the main passage is joined to the connecting passage, a cross-sectional area of a space between the first dynamic thrust bearing and the support plate, and a cross-sectional area of a space between the second dynamic thrust bearing and the support plate.

Advantageous Effects of Invention

According to the present disclosure, the first dynamic thrust bearing and the second dynamic thrust bearing are efficiently cooled while the high precision in the clearance between the first dynamic thrust bearing and the support plate and between the second dynamic thrust bearing and the support plate is maintained.

DESCRIPTION OF THE EMBODIMENTS

An embodiment of a centrifugal compressor corresponding to a fluid machine will be described in the following paragraphs with reference to FIGS. 1 to 5. The centrifugal compressor of the present embodiment is mounted on a fuel cell vehicle. On the fuel cell vehicle, a fuel cell system configured to supply oxygen and hydrogen to fuel cells to generate electricity is mounted. Then, the centrifugal compressor compresses air including the oxygen supplied to the fuel cells. The air corresponds to fluid.

Figure 1:
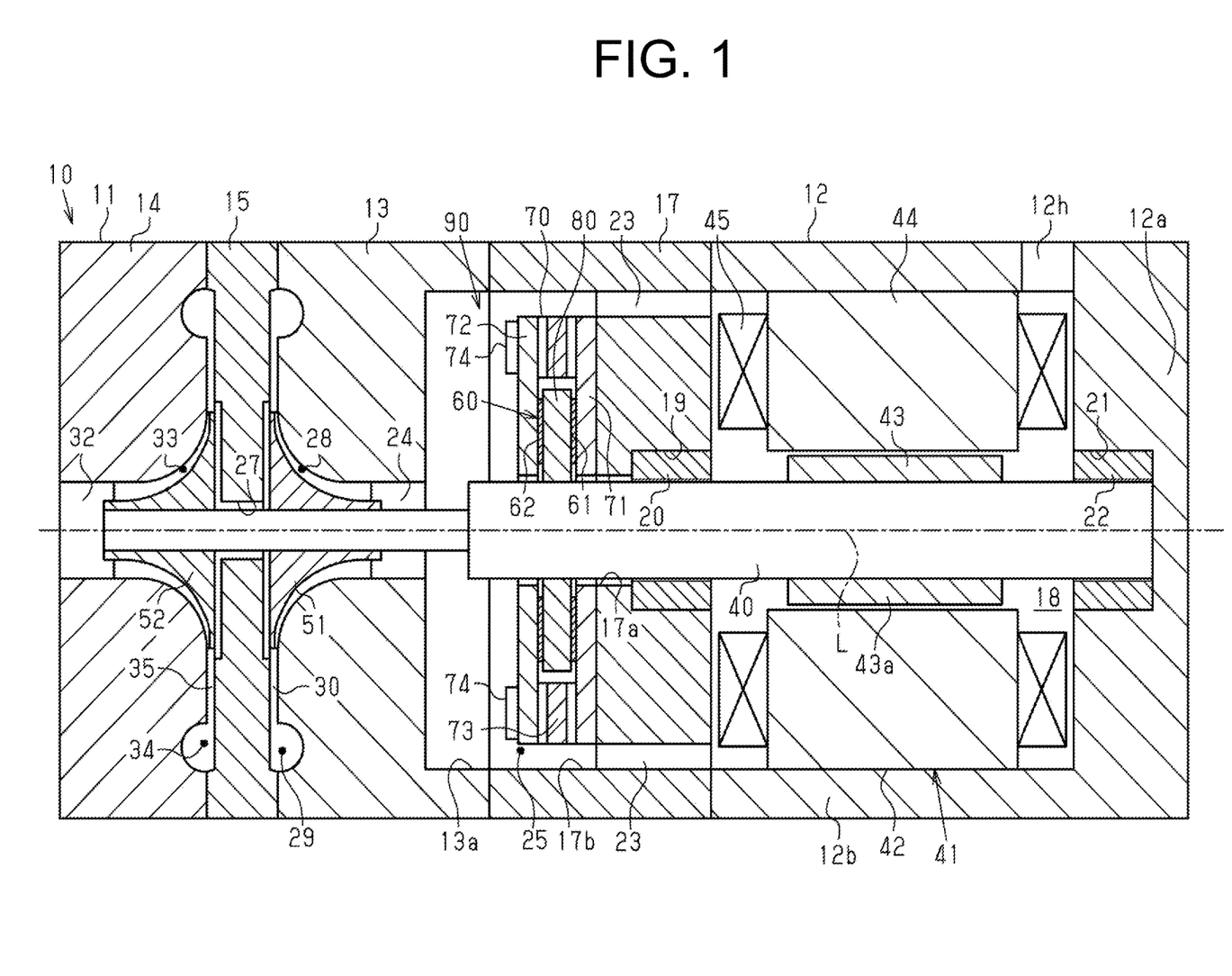
FIG. 1 is a sectional side view of a centrifugal compressor according to an embodiment.

As illustrated in FIG. 1, a centrifugal compressor 10 includes a housing 11 that has a tubular shape. The housing 11 includes a motor housing 12, a first compressor housing 13, a second compressor housing 14, a partition wall 15, and an intermediate housing 17. Each of the motor housing 12, the first compressor housing 13, the second compressor housing 14, the partition wall 15, and the intermediate housing 17 is made of metal such as aluminum.

The motor housing 12 has a bottomed tubular shape and includes an end wall 12a having a tabular shape and a peripheral wall 12b extending in a tubular manner from an outer periphery of the end wall 12a. The intermediate housing 17 is connected to the motor housing 12 in a state where an opening of the intermediate housing 17 on a side of the peripheral wall 12b opposite to the end wall 12a is closed. The end wall 12a and the peripheral wall 12b of the motor housing 12, and the intermediate housing 17 define a motor chamber 18. Thus, the housing 11 includes the motor chamber 18. The motor housing 12 has an inlet hole 12h through which air is drawn. The inlet hole 12h is formed in the peripheral wall 12b at a position close to the end wall 12a. The inlet hole 12h communicates with the motor chamber 18. Thus, air is drawn into the motor chamber 18 through the inlet hole 12h.

The intermediate housing 17 has a shaft insertion hole 17a that is a circular hole formed in a central region of the intermediate housing 17. The intermediate housing 17 has a first bearing holding portion 19 with a cylindrical shape. The first bearing holding portion 19 is formed in the central region of the intermediate housing 17. An inside of the first bearing holding portion 19 communicates with the shaft insertion hole 17a. A central axis of the first bearing holding portion 19 coincides with a central axis of the shaft insertion hole 17a. The first bearing holding portion 19 holds a first dynamic radial bearing 20.

The end wall 12a of the motor housing 12 has a second bearing holding portion 21 with a cylindrical shape. The second bearing holding portion 21 is formed in a central region of the end wall 12a of the motor housing 12. The central axis of the first bearing holding portion 19 coincides with a central axis of the second bearing holding portion 21. The second bearing holding portion 21 holds a second dynamic radial bearing 22.

The intermediate housing 17 has a first chamber forming recess 17b formed in an outer surface of the intermediate housing 17 on a side opposite to the motor chamber 18. The first chamber forming recess 17b communicates with the shaft insertion hole 17a. The intermediate housing 17 also has a plurality of communication passages 23. The communication passages 23 are located at positions near an outer periphery of the intermediate housing 17. The communication passages 23 are formed through the intermediate housing 17. The communication passages 23 provide communication between the motor chamber 18 and the first chamber forming recess 17b.

The first compressor housing 13 is connected to the intermediate housing 17. The first compressor housing 13 is connected to the intermediate housing 17 so as to close an opening of the first chamber forming recess 17b. The first compressor housing 13 has a tubular shape, and has a first inlet 24 that is a circular hole for drawing air. The first compressor housing 13 is connected to the intermediate housing 17 in a state where a central axis of the first inlet 24 coincides with the central axis of the shaft insertion hole 17a. The first compressor housing 13 has a second chamber forming recess 13a formed in an end surface of the first compressor housing 13 on a side close to the intermediate housing 17. The second chamber forming recess 13a communicates with the first inlet 24. The second chamber forming recess 13a also communicates with the first chamber forming recess 17b. The first chamber forming recess 17b and the second chamber forming recess 13a define a thrust bearing accommodating chamber 25. The thrust bearing accommodating chamber 25 provides communication between each of the communication passages 23 and the first inlet 24.

The partition wall 15 is connected to an end surface of the first compressor housing 13 on a side opposite to the intermediate housing 17. The partition wall 15 has a tabular shape. The partition wall 15 has a through hole 27 that is a circular hole formed in a central region of the partition wall 15. The through hole 27 extends through the partition wall 15 in a thickness direction of the partition wall 15. The partition wall 15 is connected to the first compressor housing 13 in a state where a central axis of the through hole 27 coincides with the central axis of the first inlet 24. The first inlet 24 faces the partition wall 15 in a direction in which the central axis of the first inlet 24 extends.

A first impeller chamber 28, a first discharge chamber 29, and a first diffuser flow passage 30 are formed between the partition wall 15 and the first compressor housing 13. The first impeller chamber 28 communicates with the first inlet 24. The first discharge chamber 29 extends around the central axis of the first inlet 24 so as to surround the first impeller chamber 28. The first diffuser flow passage 30 provides communication between the first impeller chamber 28 and the first discharge chamber 29.

The second compressor housing 14 has a tubular shape, and has a second inlet 32 that is a circular hole for drawing air. The second compressor housing 14 is connected to an end surface of the partition wall 15 on a side opposite to the first compressor housing 13 in a state where a central axis of the second inlet 32 coincides with the central axis of the first inlet 24. The second inlet 32 faces the partition wall 15 in a direction in which the central axis of the second inlet 32 extends.

A second impeller chamber 33, a second discharge chamber 34, and a second diffuser flow passage 35 are formed between the partition wall 15 and the second compressor housing 14. The second impeller chamber 33 communicates with the second inlet 32. The second discharge chamber 34 extends around the central axis of the second inlet 32 so as to surround the second impeller chamber 33. The second diffuser flow passage 35 provides communication between the second impeller chamber 33 and the second discharge chamber 34. Thus, the housing 11 has the first impeller chamber 28 and the second impeller chamber 33. The partition wall 15 serves as a partition between the first impeller chamber 28 and the second impeller chamber 33. The first discharge chamber 29 communicates with the second inlet 32 through a passage that is not illustrated.

The centrifugal compressor 10 includes a rotary shaft 40, and an electric motor 41 that rotates the rotary shaft 40. The electric motor 41 is accommodated in the motor chamber 18. Thus, the motor chamber 18 accommodates the electric motor 41. The rotary shaft 40 extends in an axial direction of the housing 11, through an inside of the second bearing holding portion 21, the motor chamber 18, an inside of the first bearing holding portion 19, the shaft insertion hole 17a, the thrust bearing accommodating chamber 25, the first inlet 24, the first impeller chamber 28, the through hole 27, the second impeller chamber 33, and the second inlet 32, in this order. Thus, the rotary shaft 40 is disposed across the first impeller chamber 28 and the second impeller chamber 33 while being inserted through the through hole 27. An axis L of the rotary shaft 40 coincides with central axes of the first bearing holding portion 19, the second bearing holding portion 21, the shaft insertion hole 17a, the first inlet 24, the through hole 27, and the second inlet 32. In the following description, an "axial direction of the rotary shaft 40" in which the axis L of the rotary shaft 40 extends may be referred to as a "thrust direction", and a "radial direction of the rotary shaft 40" may be referred to as a "radial direction".

The electric motor 41 includes a stator 42 and a rotor 43. The stator 42 includes a stator core 44 having a cylindrical shape, and a coil 45 wound around the stator core 44. The stator core 44 is fixed to an inner peripheral surface of the peripheral wall 12b of the motor housing 12.

The rotor 43 is disposed inside the stator core 44 in the motor chamber 18. The rotor 43 rotates integrally with the rotary shaft 40. The rotor 43 includes a rotor core 43a fixed to the rotary shaft 40, and a plurality of permanent magnets (not illustrated) provided to the rotor core 43a. The rotor 43 rotates by power supplied to the coil 45 under control of an inverter (not illustrated), and the rotary shaft 40 rotates integrally with the rotor 43.

The centrifugal compressor 10 includes a first impeller 51 and a second impeller 52. The first impeller 51 and the second impeller 52 are made of, for example, aluminum. The stiffness of the aluminum material forming the first impeller 51 and the second impeller 52 is lower than the stiffness of the aluminum material forming the partition wall 15. The first impeller 51 and the second impeller 52 are connected to a first end portion of the rotary shaft 40. The second impeller 52 is disposed closer to the first end portion of the rotary shaft 40 than the first impeller 51 is. The first dynamic radial bearing 20 and the second dynamic radial bearing 22 are disposed closer to a second end portion of the rotary shaft 40 than the first impeller 51 and the second impeller 52 are.

The first impeller 51 is accommodated in the first impeller chamber 28. The first impeller 51 has a circular truncated cone shape. The first impeller 51 is connected to the first end portion of the rotary shaft 40. The first impeller 51 rotates integrally with the rotary shaft 40. The second impeller 52 is accommodated in the second impeller chamber 33. The second impeller 52 has a circular truncated cone shape. The second impeller 52 is connected to the first end portion of the rotary shaft 40. The second impeller 52 rotates integrally with the rotary shaft 40.

The first dynamic radial bearing 20 and the second dynamic radial bearing 22 rotatably support the rotary shaft 40. The first dynamic radial bearing 20 and the second dynamic radial bearing 22 support the rotary shaft 40 in contact with the rotary shaft 40 until a speed of the rotary shaft 40 reaches a floating speed at which the rotary shaft 40 floats from the first dynamic radial bearing 20 and the second dynamic radial bearing 22. When the speed of the rotary shaft 40 reaches the floating speed, the rotary shaft 40 floats from the first dynamic radial bearing 20 and the second dynamic radial bearing 22 by dynamic pressures generated between the rotary shaft 40 and the first dynamic radial bearing 20 and between the rotary shaft 40 and the second dynamic radial bearing 22. Thus, the rotary shaft 40 is rotatably supported in noncontact with the first dynamic radial bearing 20 and the second dynamic radial bearing 22. Therefore, the first dynamic radial bearing 20 and the second dynamic radial bearing 22 serve as dynamic bearings that rotatably support the rotary shaft 40 in the radial direction. Various types of configurations are applicable to the dynamic bearings. In particular, it is desirable that each of the dynamic bearings is a foil bearing that includes a top foil and a bump foil configured to elastically support the top foil.

Figure 2:
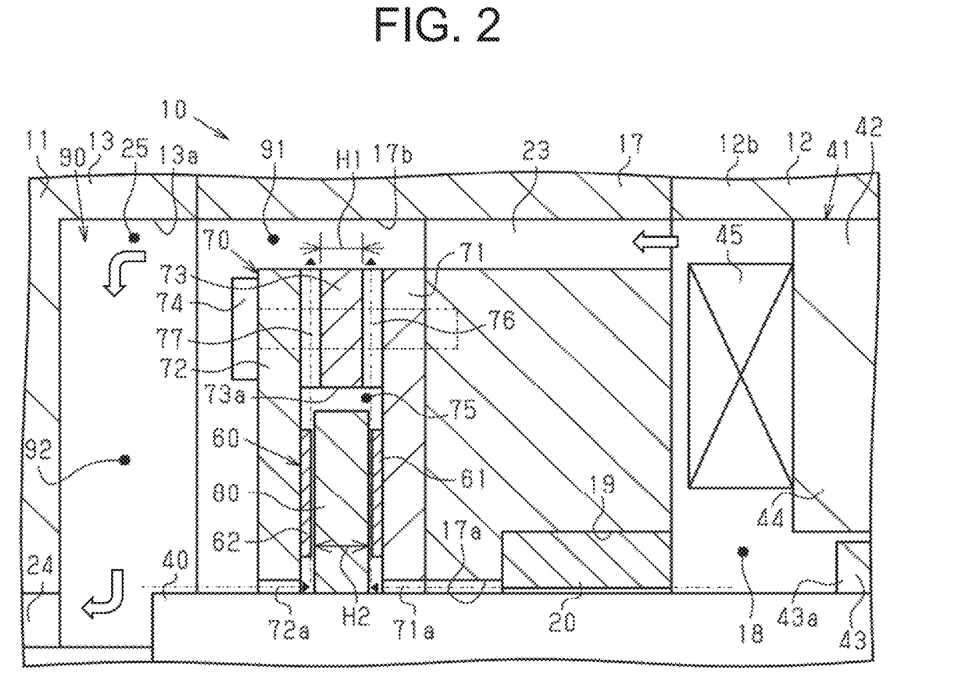
FIG. 2 is an enlarged section view of a thrust bearing support and surrounding parts.

As illustrated in FIG. 2, the centrifugal compressor 10 includes a dynamic thrust bearing 60 that rotatably supports the rotary shaft 40 in the thrust direction, a thrust bearing support 70 that supports the dynamic thrust bearing 60, and a support plate 80 that integrally rotates with the rotary shaft 40. The support plate 80 has a disc shape. The support plate 80 protrudes from an outer peripheral surface of the rotary shaft 40. The support plate 80 is press-fitted into the outer peripheral surface of the rotary shaft 40. The support plate 80 is disposed in the thrust bearing accommodating chamber 25. The support plate 80 protrudes radially outward in an annular shape from a portion of the outer peripheral surface of the rotary shaft 40 between the first impeller 51 and the electric motor 41.

Figure 3:
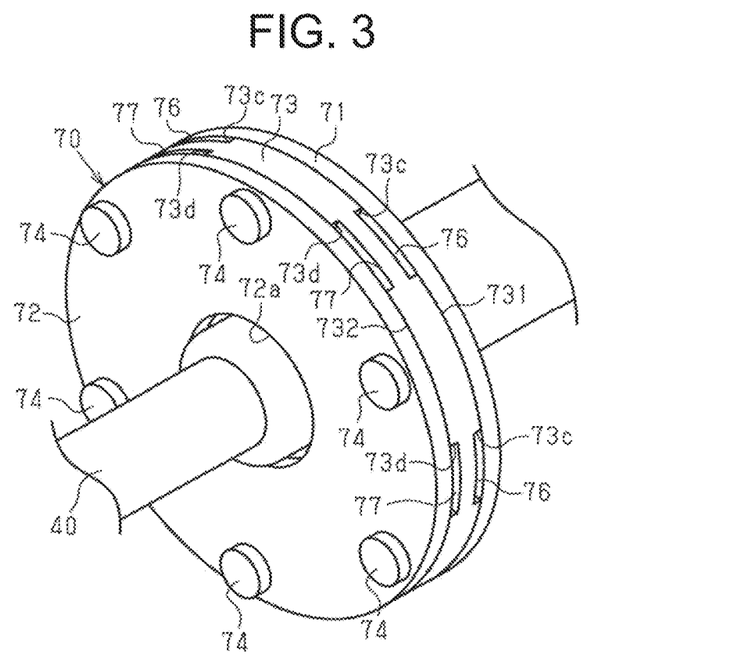
FIG. 3 is a perspective view of the thrust bearing support and surrounding parts.

As illustrated in FIGS. 2 and 3, the thrust bearing support 70 includes a first bearing base 71 and a second bearing base 72. The first bearing base 71 has a disc shape. The first bearing base 71 is disposed closer to the electric motor 41 than the support plate 80 is. The first bearing base 71 includes a first through hole 71a through which the rotary shaft 40 extends.

The second bearing base 72 has a disc shape. The second bearing base 72 is disposed closer to the first impeller 51 than the support plate 80 is. The second bearing base 72 includes a second through hole 72a through which the rotary shaft 40 extends. The second bearing base 72 cooperates with the first bearing base 71 to hold the support plate 80.

Figure 4:
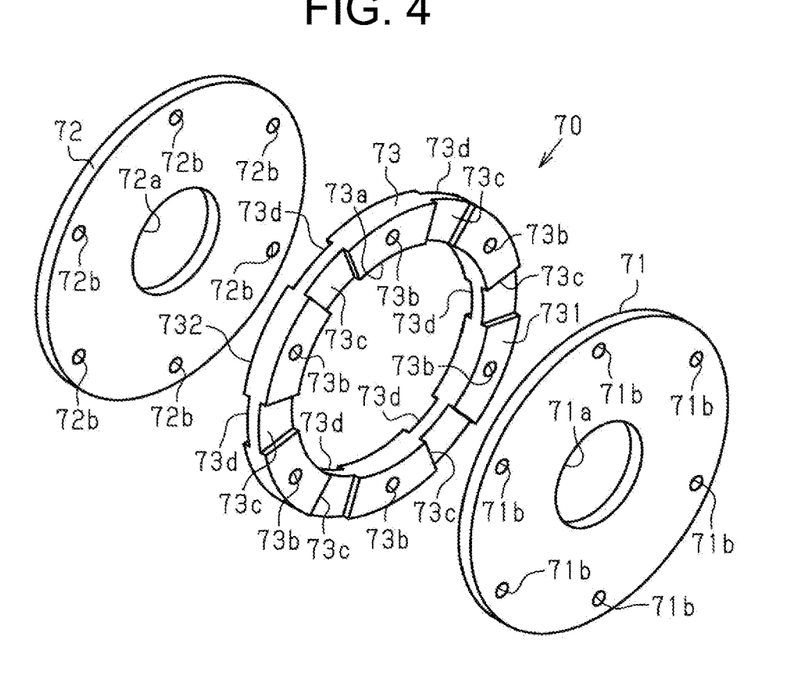
FIG. 4 is an exploded perspective view of the thrust bearing support.
Figure 5:
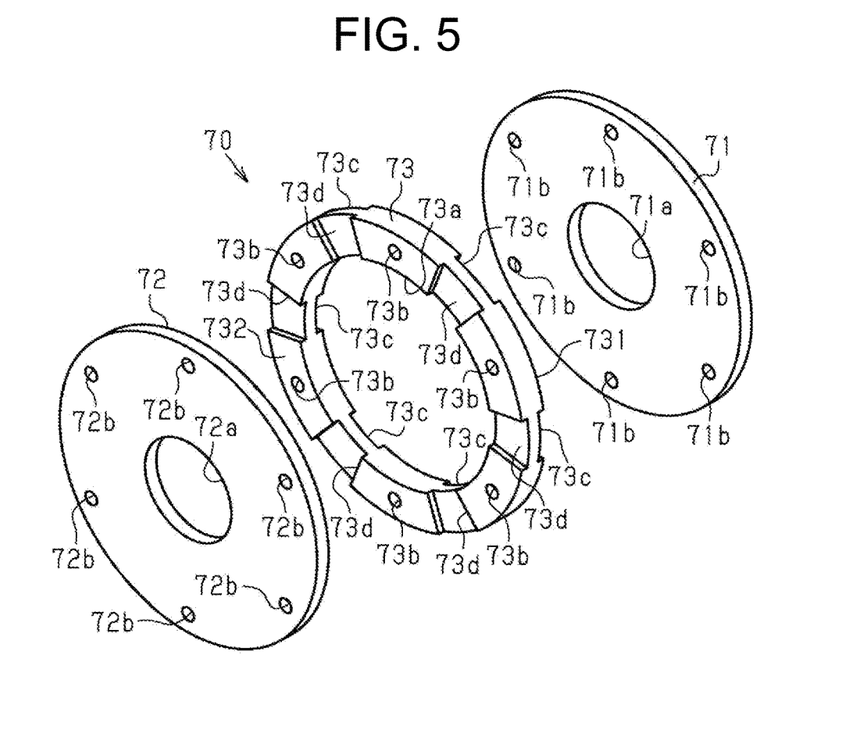
FIG. 5 is an exploded perspective view of the thrust bearing support.

As illustrated in FIGS. 4 and 5, an outer diameter of the first bearing base 71 is identical with an outer diameter of the second bearing base 72. An inner diameter of the first through hole 71a is identical with an inner diameter of the second through hole 72a. The first bearing base 71 has a plurality of first bolt insertion holes 71b formed through the first bearing base 71 in a thickness direction. The plurality of first bolt insertion holes 71b is disposed at regular intervals in a circumferential direction of the first bearing base 71. The second bearing base 72 has a plurality of second bolt insertion holes 72b formed through the second bearing base 72 in a thickness direction. The plurality of second bolt insertion holes 72b is disposed at regular intervals in a circumferential direction of the second bearing base 72. The first bearing base 71 and the second bearing base 72 are disposed in a state where the thickness directions thereof coincide with each other so that a central axis of the first through hole 71a coincides with a central axis of the second through hole 72a and also that the first bolt insertion holes 71b and the associated second bolt insertion holes 72b are superposed on each other.

As illustrated in FIG. 2, the dynamic thrust bearing 60 includes a first dynamic thrust bearing 61 and a second dynamic thrust bearing 62. The first dynamic thrust bearing 61 is disposed between the first bearing base 71 and the support plate 80. And the first dynamic thrust bearing 61 rotatably supports the rotary shaft 40 in the thrust direction. The second dynamic thrust bearing 62 is disposed between the second bearing base 72 and the support plate 80. And the second dynamic thrust bearing 62 rotatably supports the rotary shaft 40 in the thrust direction.

The following describes the first dynamic thrust bearing 61 and the second dynamic thrust bearing 62 more specifically. When the support plate 80 rotates with rotation of the rotary shaft 40, dynamic pressures are generated between the first dynamic thrust bearing 61 and the support plate 80 and between the second dynamic thrust bearing 62 and the support plate 80. Those dynamic pressures generated by the first dynamic thrust bearing 61 and the second dynamic thrust bearing 62 cause the support plate 80 to float from the first dynamic thrust bearing 61 and the second dynamic thrust bearing 62 so that the support plate 80 is rotatably supported in noncontact with the first dynamic thrust bearing 61 and the second dynamic thrust bearing 62. Thus, the first dynamic thrust bearing 61 and the second dynamic thrust bearing 62 are dynamic bearings that rotatably support the rotary shaft 40 in the thrust direction. Various types of configurations are applicable to the dynamic bearings. In particular, it is desirable that each of the dynamic bearings is a foil bearing that includes a top foil and a bump foil configured to elastically support the top foil.

As illustrated in FIGS. 2 and 3, the thrust bearing support 70 includes a spacer member 73. The spacer member 73 has an annular shape and includes an accommodating hole 73a in which the support plate 80 is accommodatable. Thus, the spacer member 73 is disposed on an outer side of the support plate 80 in the radial direction of the rotary shaft 40. The spacer member 73 is interposed between the first bearing base 71 and the second bearing base 72. A thickness direction of the spacer member 73 coincides with the thickness directions of the first bearing base 71 and the second bearing base 72. The spacer member 73 has a first facing surface 731 facing the first bearing base 71 and a second facing surface 732 facing the second bearing base 72. The first facing surface 731 is in surface contact with the first bearing base 71. The second facing surface 732 is in surface contact with the second bearing base 72.

As illustrated in FIGS. 4 and 5, an outer diameter of the spacer member 73 is identical with the outer diameters of the first bearing base 71 and the second bearing base 72. An inner diameter of the accommodating hole 73a of the spacer member 73 is greater than the inner diameters of the first through hole 71a and the second through hole 72a. The spacer member 73 has a plurality of third bolt insertion holes 73b formed through the spacer member 73 in the thickness direction. The plurality of the third bolt insertion holes 73b is disposed at regular intervals in a circumferential direction of the spacer member 73. With respect to the first bearing base 71 and the second bearing base 72, the spacer member 73 is disposed so that a central axis of the accommodating hole 73a coincides with the central axes of the first through hole 71a and the second through hole 72a and also that the third bolt insertion holes 73b, the associated first bolt insertion holes 71b, and the associated second bolt insertion holes 72b are superposed on one another.

The first facing surface 731 has a plurality of first passage forming grooves 73c. The plurality of first passage forming grooves 73c is disposed at regular intervals in the circumferential direction of the spacer member 73. Each of the plurality of first passage forming grooves 73c is arranged between any two of the third bolt insertion holes 73b adjacent to each other in the circumferential direction of the spacer member 73. The plurality of first passage forming grooves 73c interconnects an inner peripheral surface and an outer peripheral surface of the spacer member 73. Thus, the plurality of first passage forming grooves 73c communicates with the accommodating hole 73a of the spacer member 73. The plurality of first passage forming grooves 73c radially extends with the central axis of the accommodating hole 73a as a radial center thereof.

The second facing surface 732 has a plurality of second passage forming grooves 73d. The plurality of second passage forming grooves 73d is disposed at regular intervals in the circumferential direction of the spacer member 73. Each of the plurality of second passage forming grooves 73d is arranged between any two of the third bolt insertion holes 73b adjacent to each other in the circumferential direction of the spacer member 73. The plurality of second passage forming grooves 73d interconnects the inner peripheral surface and the outer peripheral surface of the spacer member 73. Thus, the plurality of second passage forming grooves 73d communicates with the accommodating hole 73a of the spacer member 73. The plurality of second passage forming grooves 73d radially extends with the central axis of the accommodating hole 73a as a radial center thereof. The first passage forming grooves 73c and the second passage forming grooves 73d are disposed so that the first passage forming grooves 73c and the associated second passage forming grooves 73d are superposed on each other in the thickness direction of the spacer member 73.

As illustrated in FIGS. 2 and 3, the first bearing base 71 and the second bearing base 72 are fixed to each other via the spacer member 73. Specifically, a plurality of bolts 74 is screwed through the associated second bolt insertion holes 72b, the associated third bolt insertion holes 73b, and the associated first bolt insertion holes 71b in this order into the intermediate housing 17 so that the first bearing base 71 and the second bearing base 72 with the spacer member 73 interposed therebetween are fixed to the intermediate housing 17.

The thickness of the spacer member 73 is set so that a clearance between the first dynamic thrust bearing 61 and the support plate 80 and a clearance between the second dynamic thrust bearing 62 and the support plate 80 have desired values when the support plate 80 rotates in noncontact with the first dynamic thrust bearing 61 and the second dynamic thrust bearing 62.

A thrust peripheral space 75 serving as a space formed between an inner side of the spacer member 73 in the radial direction of the rotary shaft 40 and an outer side of the first dynamic thrust bearing 61 and the second dynamic thrust bearing 62 in the radial direction of the rotary shaft 40 communicates with the first through hole 71a through the clearance between the first dynamic thrust bearing 61 and the support plate 80. The thrust peripheral space 75 also communicates with the second through hole 72a through the clearance between the second dynamic thrust bearing 62 and the support plate 80.

As illustrated in FIG. 2, a main passage 90 is formed inside the housing 11, through which air flows from the motor chamber 18 toward the first impeller chamber 28 while passing outside the first bearing base 71, the spacer member 73, and the second bearing base 72. The main passage 90 includes the communication passages 23, a first passage 91, and a second passage 92. The first passage 91 is an annular space and located inside the first chamber forming recess 17b in the thrust bearing accommodating chamber 25 and outside the first bearing base 71, the spacer member 73, and the second bearing base 72. The second passage 92 is a space inside the second chamber forming recess 13a in the thrust bearing accommodating chamber 25 and disposed closer to the first impeller chamber 28 than the thrust bearing support 70 is. The first passage 91 communicates with the communication passages 23. The first passage 91 and the second passage 92 communicate with each other. The second passage 92 communicates with the first inlet 24.

A space between the first dynamic radial bearing 20 and the rotary shaft 40 communicates with the motor chamber 18. The first dynamic radial bearing 20 is disposed between the electric motor 41 and the support plate 80, serving as a dynamic radial bearing that rotatably support the rotary shaft 40 in the radial direction. The first through hole 71a communicates with the space between the first dynamic radial bearing 20 and the rotary shaft 40. Thus, the first through hole 71a communicates with the motor chamber 18 through the space between the first dynamic radial bearing 20 and the rotary shaft 40. The second through hole 72a communicates with the second passage 92 of the main passage 90.

As illustrated in FIGS. 2 and 3, the thrust bearing support 70 includes a plurality of connecting passages 76 and a plurality of connecting passages 77. The connecting passages 76 each are a space defined by each of the associated first passage forming grooves 73c and the first bearing base 71. An end of each of the connecting passages 76 communicates with the thrust peripheral space 75. The other end of each of the connecting passages 76 communicates with the first passage 91 of the main passage 90. Thus, the connecting passages 76 each interconnect the thrust peripheral space 75 and the main passage 90. The connecting passages 76 each extend through the spacer member 73 in the radial direction of the rotary shaft 40. Thus, the connecting passages 76 each are a radial passage formed in the spacer member 73 so as to interconnect the inner periphery and the outer periphery of the spacer member 73. The plurality of connecting passages 76 radially extends so as to be spaced in the circumferential direction of the spacer member 73.

The connecting passages 77 each are a space defined by each of the associated second passage forming grooves 73d and the second bearing base 72. An end of each of the connecting passages 77 communicates with the thrust peripheral space 75. The other end of each of the connecting passages 77 communicates with the first passage 91 of the main passage 90. Thus, the connecting passages 77 each interconnect the thrust peripheral space 75 and the main passage 90. The connecting passages 77 each extend through the spacer member 73 in the radial direction of the rotary shaft 40. Thus, the connecting passages 77 each are a radial passage formed in the spacer member 73 so as to interconnect the inner periphery and the outer periphery of the spacer member 73. The plurality of connecting passages 77 radially extends so as to be spaced in the circumferential direction of the spacer member 73.

The first passage 91 is a joint part of the main passage 90 where the main passage 90 is joined to the connecting passages 76 and the connecting passages 77. The second passage 92 is a passage downstream from the joint part of the main passage 90 where the main passage 90 is joined to the connecting passages 76 and the connecting passages 77. The communication passages 23 are passages upstream from the joint part of the main passage 90 where the main passage 90 is joined to the connecting passages 76 and the connecting passages 77.

A sum of all of passage cross-sectional areas of the connecting passages 76 and the connecting passages 77 is greater than a cross-sectional area of the space between the first dynamic radial bearing 20 and the rotary shaft 40. The sum of all of the passage cross-sectional areas of the connecting passages 76 and the connecting passages 77 is greater than a cross-sectional area of a space between the first dynamic thrust bearing 61 and the support plate 80 and a cross-sectional area of a space between the second dynamic thrust bearing 62 and the support plate 80. A passage cross-sectional area of the first through hole 71a is greater than the cross-sectional area of the space between the first dynamic radial bearing 20 and the rotary shaft 40. A passage cross-sectional area of the second passage 92 is greater than a sum of passage cross-sectional areas of the communication passages 23, the cross-sectional area of the space between the first dynamic thrust bearing 61 and the support plate 80, and the cross-sectional area of the space between the second dynamic thrust bearing 62 and the support plate 80.

In the thickness direction of the spacer member 73, a thickness H1 of a portion between each of the connecting passages 76 and the associated one of connecting passages 77 is smaller than a thickness H2 of the support plate 80. The inner peripheral surface of the spacer member 73 is disposed so close to an outer peripheral surface of the support plate 80 as to reduce orbiting motion of air generated outside the support plate 80 when the support plate 80 rotates. It is noted that the first dynamic thrust bearing 61 and the second dynamic thrust bearing 62 do not protrude as outward as the outer peripheral surface of the support plate 80 does in the radial direction of the rotary shaft 40.

In the centrifugal compressor 10, air is drawn into the motor chamber 18 through the inlet hole 12h. Most of the air drawn into the motor chamber 18 flows through the communication passages 23, the first passage 91, and the second passage 92, and then is drawn into the first inlet 24. The air drawn into the first inlet 24 increases in pressure by a centrifugal force of the first impeller 51, then, is sent through the first impeller chamber 28 into the first diffuser flow passage 30, and further increases in pressure in the first diffuser flow passage 30. The air that has flowed through the first diffuser flow passage 30 is discharged into the first discharge chamber 29. The first impeller 51 thus serves as an operation body that causes air to be drawn from the motor chamber 18 into the first impeller chamber 28 and discharged from the first impeller chamber 28 into the first discharge chamber 29 by rotation of the rotary shaft 40. The first impeller chamber 28 serves as an operation chamber to accommodate the first impeller 51 serving as the operation body. The first discharge chamber 29 serves as a discharge chamber into which air is discharged from the first impeller chamber 28 serving as the operation chamber.

The air discharged into the first discharge chamber 29 is drawn from the first discharge chamber 29 into the second inlet 32 through a passage (not illustrated). The air drawn into the second inlet 32 increases in pressure by a centrifugal force of the second impeller 52, then, is sent through the second impeller chamber 33 into the second diffuser flow passage 35, and further increases in pressure in the second diffuser flow passage 35. The air that has flowed through the second diffuser flow passage 35 is discharged into the second discharge chamber 34.

Operations of the embodiment will now be described below.

Part of the air drawn into the motor chamber 18 flows through the space between the first dynamic radial bearing 20 and the rotary shaft 40 into the first through hole 71a. In addition, part of the air flowing through the second passage 92 flows into the second through hole 72a.

The air that has flowed into the first through hole 71a swirls about by the centrifugal force of the support plate 80 that rotates integrally with the rotary shaft 40, and flows through the clearance between the first dynamic thrust bearing 61 and the support plate 80 so that the first dynamic thrust bearing 61 is cooled. The air that has flowed through the clearance between the first dynamic thrust bearing 61 and the support plate 80 flows into the thrust peripheral space 75. On the other hand, the air that has flowed into the second through hole 72a swirls about by the centrifugal force of the support plate 80 that rotates integrally with the rotary shaft 40, and flows through the clearance between the second dynamic thrust bearing 62 and the support plate 80 so that the second dynamic thrust bearing 62 is cooled. The air that has flowed through the clearance between the second dynamic thrust bearing 62 and the support plate 80 flows into the thrust peripheral space 75.

Now, the air between the first dynamic thrust bearing 61 and the support plate 80 and the air between the second dynamic thrust bearing 62 and the support plate 80 flow into the thrust peripheral space 75 so that the air in the thrust peripheral space 75 increases in pressure. This causes the air in the thrust peripheral space 75 to have a different pressure from the air in the first passage 91 of the main passage 90 so that the air in the thrust peripheral space 75 flows through the connecting passages 76 and the connecting passages 77 to the first passage 91 of the main passage 90.

This configuration thus allows air to easily flow out from the motor chamber 18, through the first through hole 71a, through the clearance between the first dynamic thrust bearing 61 and the support plate 80, to the thrust peripheral space 75, through the connecting passages 76 and the connecting passages 77, into the first passage 91 of the main passage 90. This configuration also allows air to easily flow out from the second passage 92 of the main passage 90, through the second through hole 72a, through the clearance between the second dynamic thrust bearing 62 and the support plate 80, to the thrust peripheral space 75, through the connecting passages 76 and the connecting passages 77, into the first passage 91 of the main passage 90. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled.

The above-described embodiment offers the advantageous effects described below.

(1) For example, in a case where the first dynamic thrust bearing 61 is disposed between the intermediate housing 17 and the support plate 80, and the second dynamic thrust bearing 62 is disposed between part of the first compressor housing 13 and the support plate 80, mating surfaces of the intermediate housing 17 and the first compressor housing 13 in the thrust direction need to be suitably positioned so as to obtain desirable clearances between the first dynamic thrust bearing 61 and the support plate 80 and between the second dynamic thrust bearing 62 and the support plate 80. This may cause difficulty in obtaining high precision in the clearances between the first dynamic thrust bearing 61 and the support plate 80 and between the second dynamic thrust bearing 62 and the support plate 80. On the other hand, in the above-described embodiment, the first bearing base 71 and the second bearing base 72 are fixed to each other via the spacer member 73, which permits obtaining the high precision in the clearances between the first dynamic thrust bearing 61 and the support plate 80 and between the second dynamic thrust bearing 62 and the support plate 80.

The thrust bearing support 70 includes the connecting passages 76 and the connecting passages 77 that interconnect the thrust peripheral space 75 and the main passage 90. This configuration causes the air in the thrust peripheral space 75 to have a different pressure from the air in the main passage 90 so that the air in the thrust peripheral space 75 flows through the connecting passages 76 and the connecting passages 77 to the main passage 90. Therefore, air easily flows out from the motor chamber 18, through the first through hole 71a, through the clearance between the first dynamic thrust bearing 61 and the support plate 80, to the thrust peripheral space 75, through the connecting passages 76 and the connecting passages 77, into the main passage 90. Air also easily flows out from the main passage 90, through the second through hole 72a, through the clearance between the second dynamic thrust bearing 62 and the support plate 80, to the thrust peripheral space 75, through the connecting passages 76 and the connecting passages 77, into the main passage 90. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled. As described above, the first dynamic thrust bearing 61 and the second dynamic thrust bearing 62 are efficiently cooled while the high precision in the clearances between the first dynamic thrust bearing 61 and the support plate 80 and between the second dynamic thrust bearing 62 and the support plate 80 is maintained.

(2) The spacer member 73 has the annular shape and includes the accommodating hole 73a in which the support plate 80 is accommodatable. As compared to a case where, for example, a plurality of spacer members having a tubular shape is disposed around the axis of the rotary shaft 40 and is interposed between the first bearing base 71 and the second bearing base 72, the configuration of the above-described embodiment permits obtaining high precision in the clearances between the first dynamic thrust bearing 61 and the support plate 80 and between the second dynamic thrust bearing 62 and the support plate 80. Since the connecting passages 76 and the connecting passages 77 are the radial passages formed in the spacer member 73 so as to interconnect the inner periphery and the outer periphery of the spacer member 73, the connecting passages 76 and the connecting passages 77 extend from the thrust peripheral space 75 in the radial direction of the rotary shaft 40 to be connected with the main passage 90. In this configuration, air, which has swirled about by the centrifugal force of the support plate 80 that rotates integrally with the rotary shaft 40 and has flowed through the clearances between the first dynamic thrust bearing 61 and the support plate 80 and between the second dynamic thrust bearing 62 and the support plate 80 into the thrust peripheral space 75, easily flows toward the connecting passages 76 and the connecting passages 77. Thus, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, even further. As a result, the first dynamic thrust bearing 61 and the second dynamic thrust bearing 62 are further efficiently cooled.

(3) The configuration in which the plurality of connecting passages 76 radially extends so as to be spaced in the circumferential direction of the spacer member 73 and the plurality of connecting passages 77 radially extends so as to be spaced in the circumferential direction of the spacer member 73 is suitable for a configuration in which the thrust bearing support 70 includes a plurality of the radial passages formed in the spacer member 73 so as to interconnect the inner periphery and the outer periphery of the spacer member 73. In this configuration, air in the thrust peripheral space 75 easily flows through the connecting passages 76 and the connecting passages 77 to the main passage 90, as compared to a case where the thrust bearing support 70 includes only a single connecting passage. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, even further, so that the first dynamic thrust bearing 61 and the second dynamic thrust bearing 62 are further efficiently cooled.

(4) The sum of all of the passage cross-sectional areas of the connecting passages 76 and the connecting passages 77 is greater than the cross-sectional area of the space between the first dynamic radial bearing 20 and the rotary shaft 40. The sum of all of the passage cross-sectional areas of the connecting passages 76 and the connecting passages 77 is also greater than the cross-sectional area of the space between the first dynamic thrust bearing 61 and the support plate 80 and the cross-sectional area of the space between the second dynamic thrust bearing 62 and the support plate 80. For example, as compared to a case where the sum of all of the passage cross-sectional areas of the connecting passages 76 and the connecting passages 77 is not greater than the cross-sectional area of the space between the first dynamic radial bearing 20 and the rotary shaft 40, and also to a case where the sum of all of the passage cross-sectional areas of the connecting passages 76 and the connecting passages 77 is not greater than the cross-sectional area of the space between the first dynamic thrust bearing 61 and the support plate 80 and the cross-sectional area of the space between the second dynamic thrust bearing 62 and the support plate 80, air in the thrust peripheral space 75 easily flows into the connecting passages 76 and the connecting passages 77 in the above-described embodiment. Therefore, the air in the thrust peripheral space 75 easily flows through the connecting passages 76 and the connecting passages 77 to the main passage 90. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled.

(5) The passage cross-sectional area of the first through hole 71a is greater than the cross-sectional area of the space between the first dynamic radial bearing 20 and the rotary shaft 40. This configuration allows the air that has flowed through the space between the first dynamic radial bearing 20 and the rotary shaft 40 to easily flow into the first through hole 71a, as compared to a case where, for example, the passage cross-sectional area of the first through hole 71a is not greater than the cross-sectional area of the space between the first dynamic radial bearing 20 and the rotary shaft 40. Therefore, the air flowing through the space between the first dynamic radial bearing 20 and the rotary shaft 40 easily flows through the first through hole 71a and between the first dynamic thrust bearing 61 and the support plate 80, in addition to that the air in the thrust peripheral space 75 easily flows into the connecting passages 76 and the connecting passages 77. As a result, the first dynamic thrust bearing 61 is further efficiently cooled.

(6) The passage cross-sectional area of the second passage 92 is greater than the sum of all the passage cross-sectional areas of the communication passages 23, the cross-sectional area of the space between the first dynamic thrust bearing 61 and the support plate 80, and the cross-sectional area of the space between the second dynamic thrust bearing 62 and the support plate 80. As compared to a case where, for example, the passage cross-sectional area of the second passage 92 is not greater than the sum of all the passage cross-sectional areas of the communication passages 23, the cross-sectional area of the space between the first dynamic thrust bearing 61 and the support plate 80, and the cross-sectional area of the space between the second dynamic thrust bearing 62 and the support plate 80, the air in the second passage 92 smoothly flows and thus the air in the thrust peripheral space 75 easily flows through the connecting passages 76 and the connecting passages 77 to the main passage 90 in the above-described embodiment. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled.

(7) In the thickness direction of the spacer member 73, the thickness H1 of the portion between each of the connecting passages 76 and the associated one of connecting passages 77 is smaller than the thickness H2 of the support plate 80. In this configuration, the connecting passages 76 and the connecting passages 77 easily secure the passage cross-sectional areas, as compared to a case where, for example, the thickness H1 of the portion between each of the connecting passages 76 and the associated one of connecting passages 77 is greater than the thickness H2 of the support plate 80 in the thickness direction of the spacer member 73. Therefore, the air in the thrust peripheral space 75 easily flows through the connecting passages 76 and the connecting passages 77, and thus, the air in the thrust peripheral space 75 easily flows through the connecting passages 76 and the connecting passages 77 to the main passage 90. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled.

(8) The inner peripheral surface of the spacer member 73 is disposed so close to the outer peripheral surface of the support plate 80 as to reduce the orbiting motion of the air generated outside the support plate 80 when the support plate 80 rotates. This configuration suppresses windage loss caused by the orbiting motion of the air generated outside the support plate 80, which allows the support plate 80 to smoothly rotate.

(9) The dynamic thrust bearing 60 rotatably supports the rotary shaft 40 in the thrust direction between the first impeller 51 and the electric motor 41. This configuration suitably suppresses a runout of the rotary shaft 40, as compared to a configuration in which, for example, a dynamic thrust bearing rotatably supports the rotary shaft 40 in the thrust direction at a position on a side opposite to the first impeller 51 with respect to the electric motor 41. Therefore, reliability of the centrifugal compressor 10 is improved.

The following modifications may be made to the above-described embodiment. The above-described embodiment and the following modifications may be combined with one another unless otherwise fallen into technical inconsistency.

Figure 6:
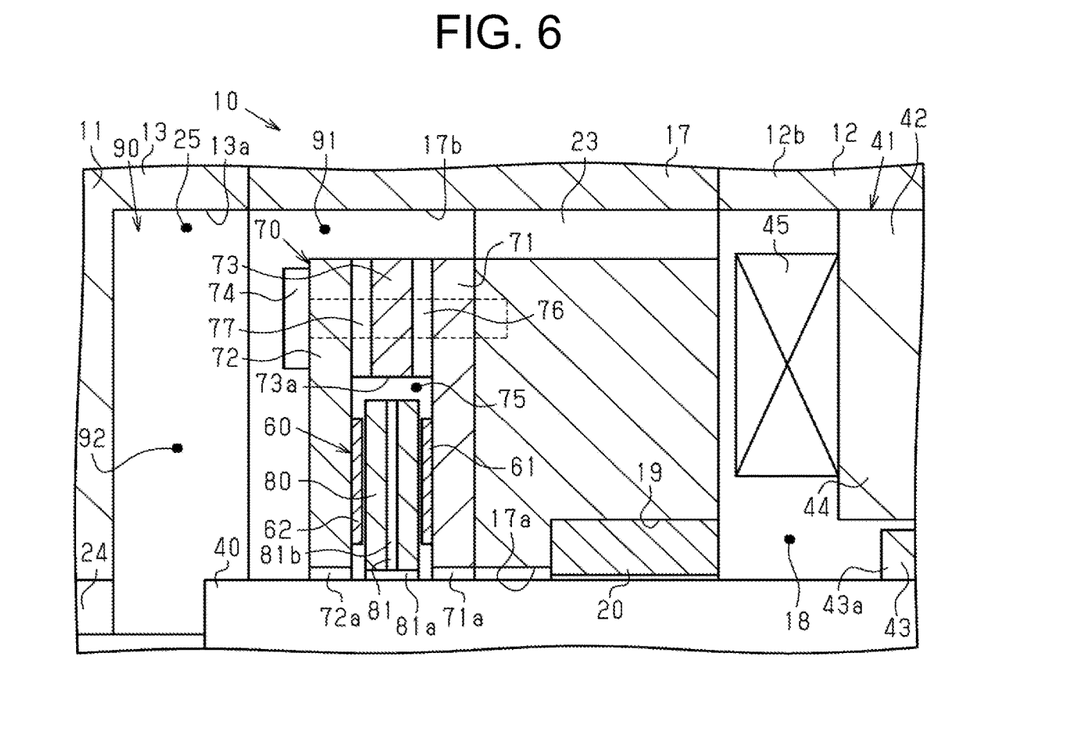
FIG. 6 is an enlarged section view of a thrust bearing support and surrounding parts according to another embodiment.

As illustrated in FIG. 6, the support plate 80 may include a linking passage 81 that links the first through hole 71a and the second through hole 72a, to the thrust peripheral space 75. The linking passage 81 includes an axial passage 81a and a radial passage 81b. The axial passage 81a extends, in the axial direction of the rotary shaft 40, through a base end portion of the support plate 80, e.g., an end portion of the support plate 80 on a side close to the rotary shaft 40. One end of the axial passage 81a communicates with the first through hole 71a. The other end of the axial passage 81a communicates with the second through hole 72a. The radial passage 81b extends from the axial passage 81a through the support plate 80 in the radial direction of the rotary shaft 40. One end of the radial passage 81b communicates with the axial passage 81a. The other end of the radial passage 81b communicates with the thrust peripheral space 75. The linking passage 81 of the support plate 80 is provided in plurality. The axial passages 81a of the plurality of linking passages 81 extend so as to be spaced in a circumferential direction of the support plate 80. The radial passages 81b of the plurality of linking passages 81 radially extend with the axis L of the rotary shaft 40 as a radial center thereof.

This configuration allows part of air from the first through hole 71a and part of air from the second through hole 72a to flow through the linking passages 81 into the thrust peripheral space 75, so that the air flowing through the linking passages 81 cools the support plate 80. As a result, heat of the first dynamic thrust bearing 61 is indirectly exchanged by the support plate 80 via coolant (to be cooled) so that the first dynamic thrust bearing 61 is cooled by the support plate 80, and heat of the second dynamic thrust bearing 62 is indirectly exchanged by the support plate 80 via coolant (to be cooled) so that the second dynamic thrust bearing 62 is cooled by the support plate 80.

In the embodiment as illustrated in FIG. 6, the axial passages 81a need not extend through the support plate 80 in the axial direction of the rotary shaft 40. For example, one end of each axial passage 81a may communicate with the first through hole 71a but the other end of each axial passage 81a may be closed inside the support plate 80. The linking passages 81 may be formed in any shape as long as the linking passage 81 links at least one of the first through hole 71a and the second through hole 72a to the thrust peripheral space 75 and the air from the first through hole 71a or the second through hole 72a flows through the linking passages 81 into the thrust peripheral space 75.

Figure 7:
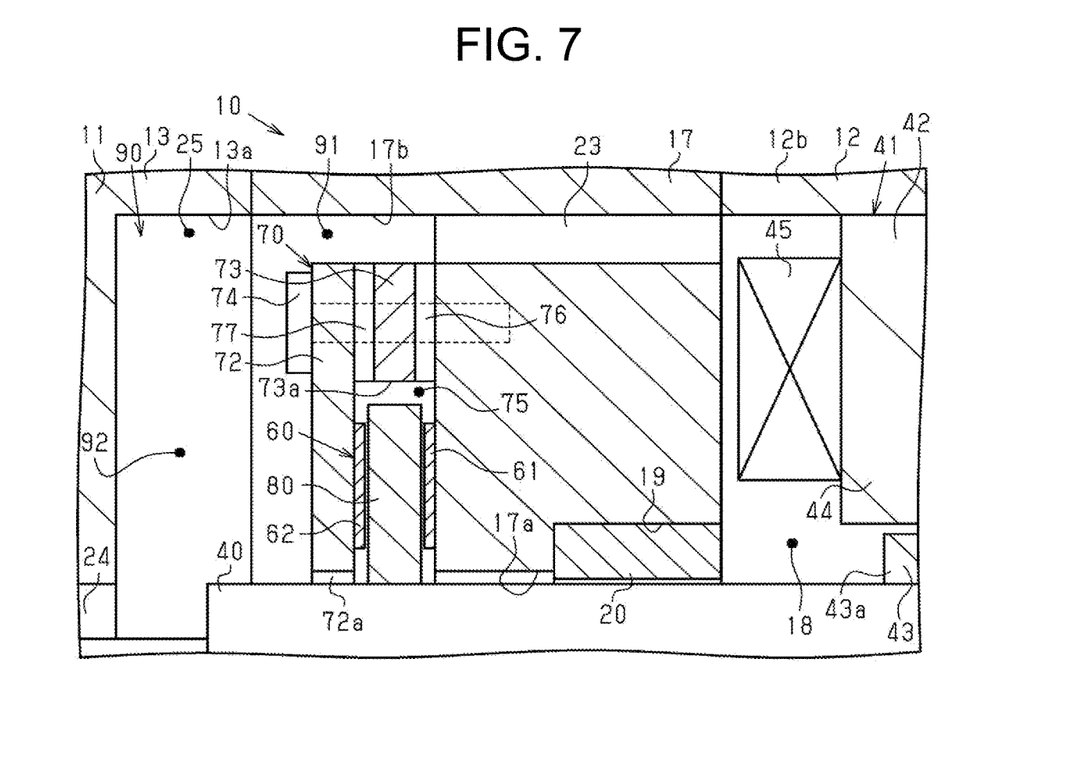
FIG. 7 is an enlarged section view of a thrust bearing support and surrounding parts according to still another embodiment.

As illustrated in FIG. 7, the centrifugal compressor 10 may have a configuration in which, for example, the intermediate housing 17 also serves as a first bearing base so that the centrifugal compressor 10 does not include a first bearing base as an independent member from the intermediate housing 17. In this case, the first dynamic thrust bearing 61 is disposed between the intermediate housing 17 and the support plate 80, and the intermediate housing 17 has the first through hole 71a.

Figure 8:
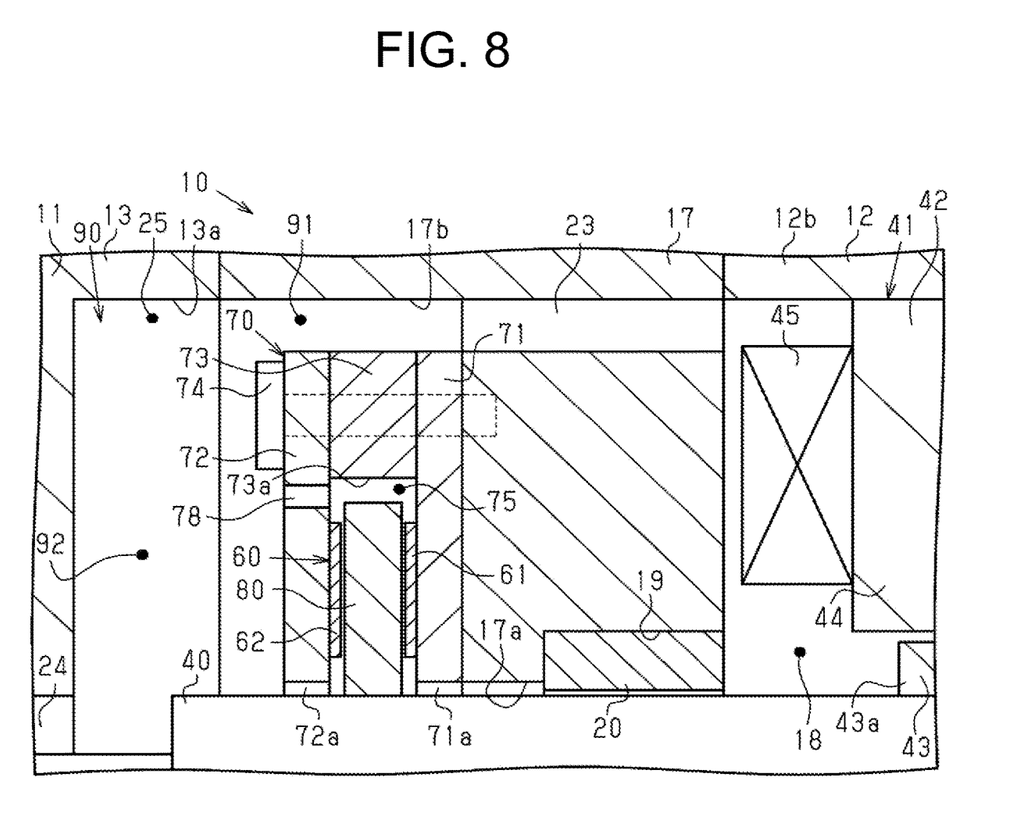
FIG. 8 is an enlarged section view of a thrust bearing support and surrounding parts according to yet another embodiment.

As illustrated in FIG. 8, the thrust bearing support 70 may have, for example, a connecting passage 78 that is formed in the second bearing base 72 and interconnects the thrust peripheral space 75 and the main passage 90, instead of the connecting passages 76 and the connecting passages 77.

In the above-described embodiment, the thrust bearing support 70 may have a configuration that does not include the connecting passages 76.

In the above-described embodiment, the thrust bearing support 70 may have a configuration that does not include the connecting passages 77.

In the above-described embodiment, the thrust bearing support 70 may have a configuration that includes the plurality of connecting passages 77 but only a single connecting passage 76.

In the above-described embodiment, the thrust bearing support 70 may have a configuration that includes the plurality of connecting passages 76 but only a single connecting passage 77.

In the above-described embodiment, the thrust bearing support 70 may have a configuration that includes a single connecting passage 76 and a single connecting passage 77.

In the above-described embodiment, the thrust bearing support 70 may have a configuration that includes only a single connecting passage 76 without any connecting passage 77.

In the above-described embodiment, the thrust bearing support 70 may have a configuration that includes only a single connecting passage 77 without any connecting passage 76.

In the above-described embodiment, for example, a plurality of spacer members having a tubular shape may be so arranged that the plurality of spacer members is disposed around the axis of the rotary shaft 40 and each spacer member is interposed between the first bearing base 71 and the second bearing base 72.

In the above-described embodiment, the sum of all of the passage cross-sectional areas of the connecting passages 76 and the connecting passages 77 may be not greater than the cross-sectional area of the space between the first dynamic radial bearing 20 and the rotary shaft 40. In addition, the sum of all of the passage cross-sectional areas of the connecting passages 76 and the connecting passages 77 may be not greater than the cross-sectional area of the space between the first dynamic thrust bearing 61 and the support plate 80 and the cross-sectional area of the space between the second dynamic thrust bearing 62 and the support plate 80.

In the above-described embodiment, the passage cross-sectional area of the first through hole 71a may be not greater than the cross-sectional area of the space between the first dynamic radial bearing 20 and the rotary shaft 40.

In the above-described embodiment, the passage cross-sectional area of the second passage 92 may be not greater than the sum of the passage cross-sectional areas of the communication passages 23, the cross-sectional area of the space between the first dynamic thrust bearing 61 and the support plate 80, and the cross-sectional area of the space between the second dynamic thrust bearing 62 and the support plate 80.

In the above-described embodiment, the passage cross-sectional area of the first through hole 71a may not be greater than the cross-sectional area of the space between the first dynamic radial bearing 20 and the rotary shaft 40. In addition, the passage cross-sectional area of the second passage 92 may be not greater than the sum of the passage cross-sectional areas of the communication passages 23, the cross-sectional area of the space between the first dynamic thrust bearing 61 and the support plate 80, and the cross-sectional area of the space between the second dynamic thrust bearing 62 and the support plate 80. Even in the above-described case, the sum of all of the passage cross-sectional areas of the connecting passages 76 and the connecting passages 77 is greater than the cross-sectional area of the space between the first dynamic radial bearing 20 and the rotary shaft 40. Also, the sum of all of the passage cross-sectional areas of the connecting passages 76 and the connecting passages 77 is greater than the cross-sectional area of the space between the first dynamic thrust bearing 61 and the support plate 80 and the cross-sectional area of the space between the second dynamic thrust bearing 62 and the support plate 80. Therefore, the air in the thrust peripheral space 75 easily flows into the connecting passages 76 and the connecting passages 77. The air in the thrust peripheral space 75 easily flows through the connecting passages 76 and the connecting passages 77 to the main passage 90. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled.

In the above-described embodiment, the sum of all of the passage cross-sectional areas of the connecting passages 76 and the connecting passages 77 may be not greater than the cross-sectional area of the space between the first dynamic radial bearing 20 and the rotary shaft 40. In addition, the sum of all of the passage cross-sectional areas of the connecting passages 76 and the connecting passages 77 may be not greater than the cross-sectional area of the space between the first dynamic thrust bearing 61 and the support plate 80 and the cross-sectional area of the space between the second dynamic thrust bearing 62 and the support plate 80. Also, the passage cross-sectional area of the second passage 92 may be not greater than the sum of the passage cross-sectional areas of the communication passages 23, the cross-sectional area of the space between the first dynamic thrust bearing 61 and the support plate 80, and the cross-sectional area of the space between the second dynamic thrust bearing 62 and the support plate 80. Even in the above-described case, since the passage cross-sectional area of the first through hole 71a is greater than the cross-sectional area of the space between the first dynamic radial bearing 20 and the rotary shaft 40, the air that has flowed through the space between the first dynamic radial bearing 20 and the rotary shaft 40 easily flows into the first through hole 71a. Therefore, the air that flows through the space between the first dynamic radial bearing 20 and the rotary shaft 40 easily flows through the first through hole 71a and between the first dynamic thrust bearing 61 and the support plate 80, by which the first dynamic thrust bearing 61 is efficiently cooled.

In the above-described embodiment, the sum of all of the passage cross-sectional areas of the connecting passages 76 and the connecting passages 77 may be not greater than the cross-sectional area of the space between the first dynamic radial bearing 20 and the rotary shaft 40. In addition, the sum of all of cross-sectional areas of the connecting passages 76 and the connecting passages 77 may be not greater than the cross-sectional area of the space between the first dynamic thrust bearing 61 and the support plate 80 and the cross-sectional area of the space between the second dynamic thrust bearing 62 and the support plate 80. Also, the passage cross-sectional area of the first through hole 71a may be not greater than the cross-sectional area of the space between the first dynamic radial bearing 20 and the rotary shaft 40. Even in the above-described case, since the passage cross-sectional area of the second passage 92 is greater than the sum of the passage cross-sectional areas of the communication passages 23, the cross-sectional area of the space between the first dynamic thrust bearing 61 and the support plate 80, and the cross-sectional area of the space between the second dynamic thrust bearing 62 and the support plate 80, the air in the second passage 92 smoothly flows. Therefore, the air in the thrust peripheral space 75 easily flows through the connecting passages 76 and the connecting passages 77 to the main passage 90. As a result, the air flowing through the clearance between the first dynamic thrust bearing 61 and the support plate 80 easily cools the first dynamic thrust bearing 61, and the air flowing through the clearance between the second dynamic thrust bearing 62 and the support plate 80 easily cools the second dynamic thrust bearing 62, so that the first dynamic thrust bearing 61 and the second dynamic thrust bearing 62 are efficiently cooled.

In the above-described embodiment, in the thickness direction of the spacer member 73, the thickness H1 of the portion between each of the connecting passages 76 and the associated one of connecting passages 77 may be same as the thickness H2 of the support plate 80.

In the above-described embodiment, in the thickness direction of the spacer member 73, the thickness H1 of the portion between each of the connecting passages 76 and the associated one of connecting passages 77 may be greater than the thickness H2 of the support plate 80.

In the above-described embodiment, the first dynamic thrust bearing 61 and the second dynamic thrust bearing 62 may protrude more outward than the outer peripheral surface of the support plate 80 does in the radial direction of the rotary shaft 40 as long as the thrust peripheral space 75, which is the space disposed more outward than the first dynamic thrust bearing 61 and the second dynamic thrust bearing 62 are in the radial direction of the rotary shaft 40, is defined by the first bearing base 71, the second bearing base 72, and the spacer member 73.

In the above-described embodiment, the first bearing base 71 and the second bearing base 72 are fixed to each other via the spacer member 73 by the plurality of bolts 74. However, the first bearing base 71 and the second bearing base 72 may be fixed to each other via the spacer member 73 by, for example, press-fit pins, instead of the bolts.

In the above-described embodiment, the centrifugal compressor 10 may have a configuration that does not include, for example, the second impeller 52.

In the above-described embodiment, the fluid compressed by the first impeller 51 and the second impeller 52 is not limited to air. Therefore, the centrifugal compressor 10 may be applied to any object, and may compress any fluid. For example, the centrifugal compressor 10 may be used for an air conditioning device, and the fluid to be compressed may be a refrigerant. In addition, the centrifugal compressor 10 may be mounted on any object, not limited to a vehicle.

In the above-described embodiment, the fluid machine may be, for example, a scroll compressor that includes a scroll mechanism serving as the operation body operating by rotation of the rotary shaft. Alternatively, the fluid machine may be, for example, a roots pump that includes two rotors serving as the operation body.

REFERENCE SIGNS LIST

10 centrifugal compressor serving as fluid machine
11 housing
12h inlet hole
18 motor chamber
20 first dynamic radial bearing serving as dynamic radial bearing
28 first impeller chamber serving as operation chamber
29 first discharge chamber serving as discharge chamber
40 rotary shaft
41 electric motor
51 first impeller serving as operation body
60 dynamic thrust bearing
61 first dynamic thrust bearing
62 second dynamic thrust bearing
70 thrust bearing support
71 first bearing base
71a first through hole
72 second bearing base
72a second through hole
73 spacer member
73a accommodating hole
75 thrust peripheral space serving as space
76, 77 connecting passage serving as radial passage
78 connecting passage
80 support plate
81 linking passage
90 main passage

The invention claimed is:
1. A fluid machine, comprising:
a rotary shaft;
an electric motor configured to rotate the rotary shaft;
a housing including a motor chamber that accommodates the electric motor, an inlet hole through which fluid is drawn into the motor chamber, an impeller chamber, and a discharge chamber;
an impeller that causes the fluid to be drawn from the motor chamber into the impeller chamber and discharged from the impeller chamber into the discharge chamber, by rotation of the rotary shaft;
a dynamic thrust bearing rotatably supporting the rotary shaft in a thrust direction;
a thrust bearing support supporting the dynamic thrust bearing; and
a support plate protruding radially outward in an annular shape from a portion of an outer peripheral surface of the rotary shaft, wherein the support plate is located between the impeller and the electric motor, and configured to rotate integrally with the rotary shaft,
the thrust bearing support including:
a first bearing base disposed closer to the electric motor than the support plate is and having a first through hole through which the rotary shaft extends; and a second bearing base disposed closer to the impeller than the support plate is and having a second through hole through which the rotary shaft extends, and the dynamic thrust bearing including:

a first dynamic thrust bearing disposed between the first bearing base and the support plate and rotatably supporting the rotary shaft in the thrust direction; and a second dynamic thrust bearing disposed between the second bearing base and the support plate and rotatably supporting the rotary shaft in the thrust direction, wherein the thrust bearing support includes a spacer member disposed on an outer side of the support plate in a radial direction of the rotary shaft and interposed between the first bearing base and the second bearing base, the first bearing base and the second bearing base are fixed to each other via the spacer member, and inside the housing:

a main passage is formed, through which the fluid flows from the motor chamber toward the impeller chamber while passing outside the first bearing base, the spacer member, and the second bearing base, the first through hole communicates with the motor chamber, the second through hole communicates with the main passage, a space is formed between an inner side of the spacer member in the radial direction of the rotary shaft and an outer side of the first dynamic thrust bearing and the second dynamic thrust bearing in the radial direction of the rotary shaft, wherein the space communicates with the first through hole through a clearance between the first dynamic thrust bearing and the support plate and communicates with the second through hole through a clearance between the second dynamic thrust bearing and the support plate, the thrust bearing support includes a connecting passage interconnecting the space and the main passage, and fluid in the space located between the inner side of the spacer member and the outer side of the first dynamic thrust bearing and the second dynamic thrust bearing flows from the space to the main passage via the connecting passage.

2. The fluid machine according to claim 1, wherein the spacer member has an annular shape and includes an accommodating hole in which the support plate is accommodatable, and the connecting passage is a radial passage formed in the spacer member so as to interconnect an inner periphery and an outer periphery of the spacer member.

3. The fluid machine according to claim 2, wherein the thrust bearing support includes a plurality of the radial passages, and the plurality of the radial passages radially extends so as to be spaced in a circumferential direction of the spacer member.

4. The fluid machine according to claim 1, wherein the support plate includes a linking passage that links at least one of the first through hole and the second through hole to the space.

5. The fluid machine according to claim 1, comprising a dynamic radial bearing disposed between the electric motor and the support plate and rotatably supporting the rotary shaft in the radial direction, wherein the first through hole communicates with a space between the dynamic radial bearing and the rotary shaft, and a passage cross-sectional area of the connecting passage is greater than a cross-sectional area of the space between the dynamic radial bearing and the rotary shaft and is greater than a cross-sectional area of a space between the first dynamic thrust bearing and the support plate and a cross-sectional area of a space between the second dynamic thrust bearing and the support plate.

6. The fluid machine according to claim 5, wherein a passage cross-sectional area of the first through hole is greater than the cross-sectional area of the space between the dynamic radial bearing and the rotary shaft.

7. The fluid machine according to claim 1, comprising a dynamic radial bearing disposed between the electric motor and the support plate and rotatably supporting the rotary shaft in the radial direction, wherein the first through hole communicates with a space between the dynamic radial bearing and the rotary shaft, and a passage cross-sectional area of the first through hole is greater than the cross-sectional area of the space between the dynamic radial bearing and the rotary shaft.

8. The fluid machine according to claim 5, wherein a passage cross-sectional area of a part of the main passage downstream from a joint part of the main passage where the main passage is joined to the connecting passage is greater than a sum of a passage cross-sectional area of a part of the main passage upstream from the joint part of the main passage where the main passage is joined to the connecting passage, the cross-sectional area of the space between the first dynamic thrust bearing and the support plate, and the cross-sectional area of the space between the second dynamic thrust bearing and the support plate.

9. The fluid machine according to claim 1, comprising a dynamic radial bearing disposed between the electric motor and the support plate and rotatably supporting the rotary shaft in the radial direction, wherein the first through hole communicates with a space between the dynamic radial bearing and the rotary shaft, and a passage cross-sectional area of a part of the main passage downstream from a joint part of the main passage where the main passage is joined to the connecting passage is greater than a sum of a passage cross-sectional area of a part of the main passage upstream from the joint part of the main passage where the main passage is joined to the connecting passage, a cross-sectional area of a space between the first dynamic thrust bearing and the support plate, and a cross-sectional area of a space between the second dynamic thrust bearing and the support plate.

\* \* \* \* \*